United States Patent Office 2,850,524
Patented Sept. 2, 1958

2,850,524

2-CHLOROETHYL 2-PHENYLCARBANILATE

David T. Mowry and Arthur H. Schlesinger, Kirkwood, Mo., assignors to Monsanto Chemical Company, St. Louis, Mo., a corporation of Delaware No Drawing. Application February 7, 1956
Serial No. 563,854

1 Claim. (Cl. 260—471)

The present invention relates to carbanilates and more particularly provides new and valuable esters of phenylcarbanilic acid and methods of preparing the same.

According to the invention there are prepared phenylcarbanilates having the formula

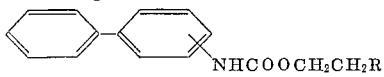
NHCOOCH₂CH₂R in which R is selected from the class consisting of —Cl, —Br and —SCN. Compounds having the above formula and provided by the invention are the 2-chloroethyl, 2-bromoethyl or 2-thiocyanoethyl esters of 2-, 3- or 4-phenylcarbanilic acid. The 2-chloroethyl phenylcarbanilates are valuable as stable high-boiling plasticizers for vinyl polymers. Both the 2-chloroethyl and the 2-bromoethyl phenylcarbanilates are readily converted, by reaction with an alkali metal or ammonium thiocyanate, into the 2-thiocyanoethyl phenylcarbanilates, which compounds possess insect-repellant properties.

The present haloethyl phenylcarbanilates are obtained by reaction of the appropriate haloethyl haloformate with o, m, or p-xenylamine, substantially according to the scheme:

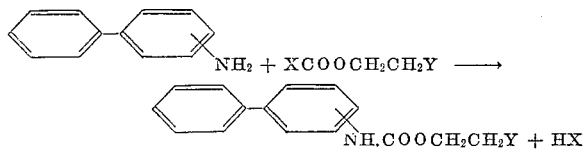
NH₂ + XCOOCH₂CH₂Y ⟶

NH.COOCH₂CH₂Y + HX in which X and Y are selected from the class consisting of chlorine and bromine. Reaction of the haloformate with the amine takes place very easily, generally, by simply mixing the two reactants, in the presence or absence of a basic agent as catalyst. Initial contact of the haloformate with the xenylamine, particularly in the presence of a catalyst, results in evolution of reaction heat. Hence in order to effect a smooth reaction, it is generally advisable to operate in the presence of an inert diluent or solvent, e. g., benzene, hexane, nitrobenzene, dioxane, etc. When using a diluent, after the initial exothermic reaction has subsided, it may be necessary to apply external heat in order to assure complete reaction within a practical period of time.

Conversion of the haloethyl phenylcarbanilates to the thiocyanoethyl compounds is conducted by contacting the haloethyl phenylcarbanilate with the inorganic thiocyanate at ordinary or increased temperatures; however, for optimum yields of the thiocyanoethyl phenylcarbanilates, it is preferred to heat a mixture of the haloethyl compound and the inorganic thiocyanate, advantageously in the presence of an inert solvent or diluent, at a temperature of from say, 60° C. to the refluxing temperature of the reaction mixture until conversion of all of the haloethyl compound into the thiocyanoethyl compound is completed. As inert diluents there may be employed aliphatic, oxygen-containing compounds such as methanol, ethanol, isopropyl alcohol, acetone, ethyl acetate and isopropyl ether; nitro compounds such as the nitroparaffins and nitrobenzene, etc. In order to facilitate removal of the inorganic halide which is formed as a by-product, it is preferred to employ as a diluent a liquid in which the halide is substantially insoluble; hence, an alcoholic or ketonic diluent is generally preferred.

Inasmuch as the condensation involves one mole of the haloethyl phenylcarbanilate with one mole of the inorganic thiocyanate, stoichiometric proportions of the reactants are advantageously employed. However, since any excess of either the halide or the thiocyanate may be readily removed from the final product the quantity of reactants initially employed is immaterial. It is preferred, however, to use an excess of the more readily available inorganic thiocyanate in order to assure complete reaction of the haloethyl compound under the reaction conditions employed. Inorganic thiocyanates which may be employed include potassium, sodium, lithium, barium, calcium, strontium, magnesium and ammonium thiocyanates.

The 2-thiocyanoethyl phenylcarbanilates are stable, rather high-boiling materials having a pleasant aromatic odor. They are particularly valuable as insect repellants, but also may be advantageously employed as rubber-compounding chemicals, and as intermediates in the production of other industrially important raw materials.

The invention is further illustrated, but not limited, by the following examples:

*Example 1*

This example describes the preparation of 2-chloroethyl 2-phenylcarbanilate.

A mixture consisting of 40.0 g. (0.276 mole) of 2-aminobiphenyl, 21.8 g. (0.276 mole) of pyridine, 39.4 g. (0.276 mole) of 2-chloroethyl chloroformate and 400 ml. of benzene was allowed to reflux for one hour. The reaction mixture was then permitted to cool, washed with water and allowed to stratify. The resulting benzene layer was washed with dilute hydrochloric acid, then with dilute aqueous sodium carbonate and finally with water. Removal of the benzene from the washed layer by distillation in vacuo gave a red syrup which did not crystallize upon standing. It was admixed with 85 percent ethanol and benzene, and the water, ethanol and benzene were stripped in vacuo from the resulting mixture to give 60.1 g. of a crude, red, residual oil. A 30.0 g. portion of this crude oil was re-distilled to yield 26.5 g. of the substantially pure 2-chloroethyl 2-phenylcarbanilate, B. P. 194–196° C./3 mm., $n^{25}_D$ 1.5955, and analyzing as follows:

| | Found | Calcd. for $C_{15}H_{14}O_2NCl$ |
|---|---|---|
| Percent C | 67.85 | 65.5 |
| Percent H | 4.88 | 5.08 |

*Example 2*

The 2-chloroethyl 2-phenylcarbanilate, B. P. 194–196° C./3 mm., of Example 1 was converted to a 2-thiocyanoethyl 2-phenylcarbanilate by employing the following procedure:

A mixture of 19.5 g. (0.0775 mole) of the 2-chloroethyl compound, 8.0 g. of potassium thiocyanate, 800 ml. of ethanol and a crystal of potassium iodide was refluxed for 114 hours. Filtration of the cooled reaction mixture gave 5.2 g. of potassium chloride (theoretical, 5.8 g.). The alcohol was removed from the filtrate by distillation in vacuo, and water was added to the residue. The oil layer which separated was removed and the aqueous layer washed with chloroform. The combined chloroform washings and the oil layer were vacuum dried to give 12.8 g. (61%) yield of the substantially pure 2-thiocyanoethyl 2-phenylcarbanilate, a clear, yellow oil.

This is a continuation-in-part of our copending application Serial No. 357,884, filed May 27, 1953, now U. S. Patent 2,786,071.

What we claim is:

2-chloroethyl 2-phenylcarbanilate of the formula:

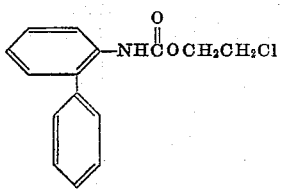

References Cited in the file of this patent

UNITED STATES PATENTS 2,634,289   Butler ------------------ Apr. 7, 1953

OTHER REFERENCES

Adams et al.: J. Am. Chem. Soc., 45, 785 to 789 (1923).
Beilstein, 12, 1318 (1929).
Schlesinger et al.: J. A. Chem. Soc., 76, 585–8 (1954).